US009247294B2

(12) United States Patent
Belz et al.

(10) Patent No.: US 9,247,294 B2
(45) Date of Patent: Jan. 26, 2016

(54) METHOD AND APPARATUS FOR MANAGING COMMUNICATION ACTIVITIES OF A COMMUNICATION DEVICE

(71) Applicant: AT&T Intellectual Property I, LP, Atlanta, GA (US)

(72) Inventors: Steven M. Belz, Cedar Park, TX (US); Greg W. Edwards, Austin, TX (US); Marc Sullivan, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 90 days.

(21) Appl. No.: 14/062,380

(22) Filed: Oct. 24, 2013

(65) Prior Publication Data
US 2015/0120902 A1  Apr. 30, 2015

(51) Int. Cl.
| H04N 21/45 | (2011.01) |
| H04L 29/08 | (2006.01) |
| H04N 21/4223 | (2011.01) |
| H04N 21/478 | (2011.01) |
| H04N 21/4788 | (2011.01) |

(52) U.S. Cl.
CPC .......... *H04N 21/4532* (2013.01); *H04L 67/303* (2013.01); *H04N 21/4223* (2013.01); *H04N 21/4781* (2013.01); *H04N 21/4788* (2013.01)

(58) Field of Classification Search
CPC ... H04L 29/08072; H04L 29/06; H04L 43/00; H04L 12/2602; H04L 41/22
See application file for complete search history.

(56) References Cited

U.S. PATENT DOCUMENTS

| 5,771,307 | A | 6/1998 | Lu et al. |
| 7,134,130 | B1 | 11/2006 | Thomas |
| 7,636,456 | B2 | 12/2009 | Collins et al. |
| 7,805,681 | B2 | 9/2010 | Hansson et al. |
| 8,046,801 | B2 | 10/2011 | Ellis et al. |
| 8,103,244 | B2 | 1/2012 | Tran et al. |
| 8,218,080 | B2 | 7/2012 | Xu et al. |
| 8,347,325 | B2 | 1/2013 | Price et al. |
| 8,387,084 | B1 | 2/2013 | Klappert et al. |

(Continued)

FOREIGN PATENT DOCUMENTS

EP 2104349 B1 11/2011

OTHER PUBLICATIONS

Alam, et al., "Introduction to Networked Home", Technologies for Home Networking, 2008.

(Continued)

*Primary Examiner* — Vivek Srivastava
*Assistant Examiner* — Hien Doan
(74) *Attorney, Agent, or Firm* — Guntin & Gust, PLC; Joseph Hrutka

(57) ABSTRACT

Aspects of the subject disclosure include, for example, selecting a first communication device of the plurality of communication devices to analyze activities of the first communication device, presenting at a device activity information associated with the activities of the first communication device, facilitating an exchange of messages between the device and the first communication device, receiving a request from the device to transfer control of the first communication device to the device responsive to the device receiving an unsatisfactory response from the first communication device, and receiving control information from the device to adjust an operational aspect of the first communication device. Other embodiments are disclosed.

19 Claims, 7 Drawing Sheets

(56) References Cited

U.S. PATENT DOCUMENTS

| | | |
|---|---|---|
| 8,510,156 B2 | 8/2013 | Sakata et al. |
| 2002/0124252 A1 | 9/2002 | Schaefer |
| 2003/0005431 A1 | 1/2003 | Shinohara |
| 2007/0294737 A1* | 12/2007 | Edwards et al. ............... 725/112 |
| 2009/0059090 A1 | 3/2009 | Fan et al. |
| 2011/0072452 A1 | 3/2011 | Shimy et al. |
| 2011/0283311 A1 | 11/2011 | Luong |
| 2011/0321082 A1* | 12/2011 | Weerasinghe .................. 725/31 |
| 2012/0081501 A1* | 4/2012 | Benzaia et al. ............ 348/14.04 |
| 2013/0104160 A1 | 4/2013 | Beeson et al. |
| 2013/0133010 A1 | 5/2013 | Chen |

OTHER PUBLICATIONS

Al-Ashraf, et al., "A proposal of a smart home platform for better home entertainment experience", 2011.

Ignat, Daniel , "Utilization of DLNA in a IPTV Solution", 2011.

* cited by examiner

100

200

METHOD AND APPARATUS FOR MANAGING COMMUNICATION ACTIVITIES OF A COMMUNICATION DEVICE

FIELD OF THE DISCLOSURE

The subject disclosure relates to a method and apparatus for managing communication activities of a communication device.

BACKGROUND

Users today have many options for consuming media content and for engaging in communications with other users. For example, a user can view or listen to media content on a computer, a smart phone, a tablet, or a television. The same user can engage in texting or voice communications with others using a smart phone, computer or tablet.

With ease of access to communication services and media content, users may not always manage their time wisely.

BRIEF DESCRIPTION OF THE DRAWINGS

Reference will now be made to the accompanying drawings, which are not necessarily drawn to scale, and wherein.

DETAILED DESCRIPTION

Figure 1:
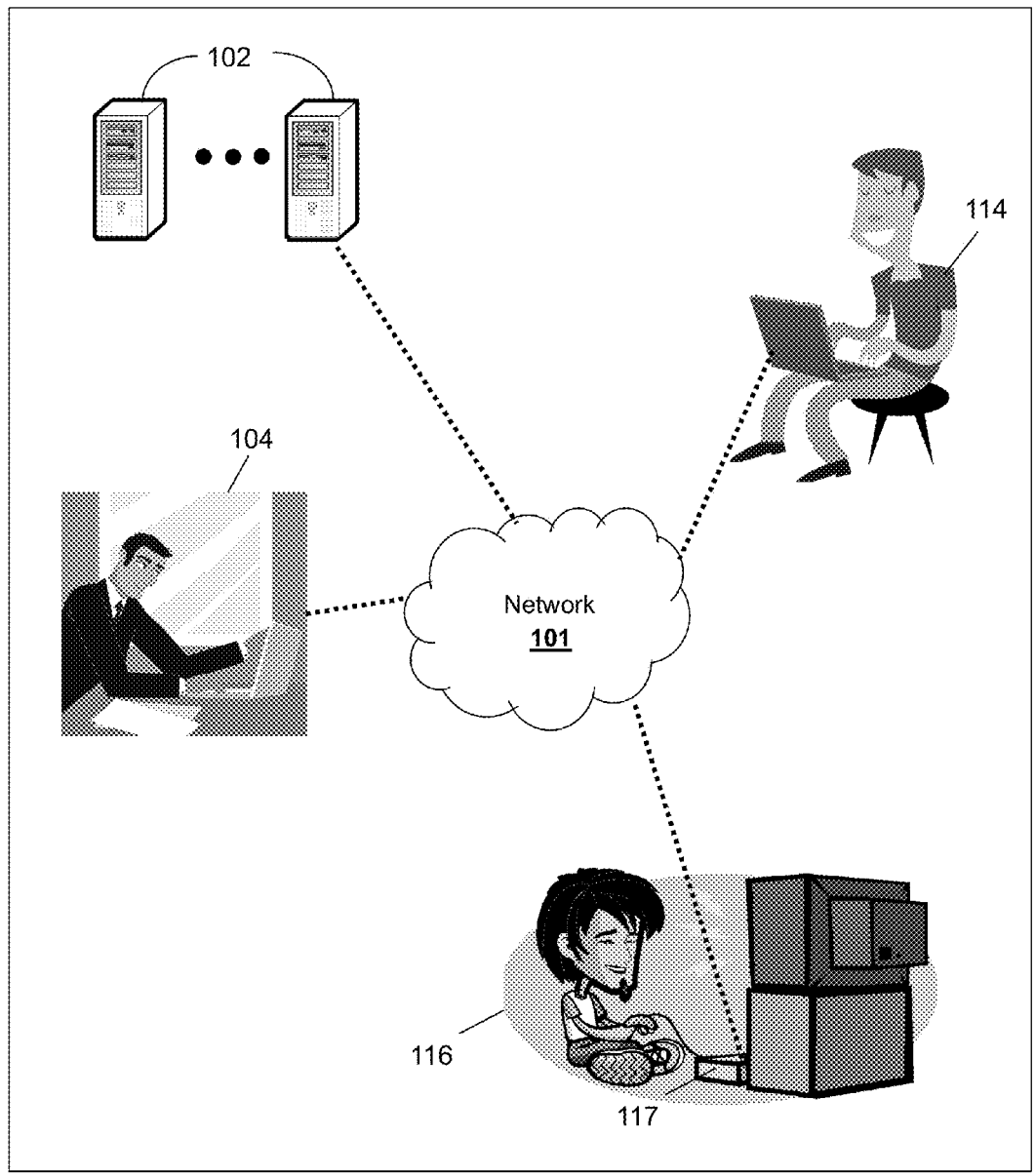
FIG. 1 depicts an illustrative embodiment of a system for monitoring and controlling devices.

The subject disclosure describes, among other things, illustrative embodiments for monitoring and controlling devices. Other embodiments are included in the subject disclosure.

One embodiment of the subject disclosure includes a network device having a memory to store executable instructions, and a processor coupled to the memory. Responsive to executing the instructions, the processor can perform operations including receiving a first request from a controller to provide status information relating to activities of a plurality of communication devices, detecting a first communication device of the plurality of communication devices engaged in a communication session, presenting at the controller activity information associated with the communication session, receiving a second request from the controller to initiate communications between the controller and the first communication device responsive to the activity information not conforming to a parental control rule, facilitating an exchange of messages between the controller and the first communication device responsive to the second request, receiving a third request from the controller to transfer control of the first communication device to the controller responsive to the controller receiving an unsatisfactory response from the first communication device during the exchange of messages, and receiving control information from the controller to adjust an operational aspect of the first communication device.

One embodiment of the subject disclosure includes a machine-readable storage medium having executable instructions, which when executed by a processor, causes the processor to perform operations including monitoring a plurality of communication devices according to a parental control profile, selecting a first communication device of the plurality of communication devices to analyze communication activities of the first communication device according to the parental control profile, presenting at a controller activity information associated with the communication activities of the first communication device, receiving a first request from the controller to initiate communications between the controller and the first communication device, facilitating an exchange of messages between the controller and the first communication device responsive to the first request, receiving a second request from the controller to transfer control of the first communication device to the controller responsive to the controller receiving an unsatisfactory response from the first communication device, and receiving control information from the controller to adjust an operational aspect of the first communication device.

One embodiment of the subject disclosure includes a method for selecting, by a system comprising a processor, a first communication device of the plurality of communication devices to analyze activities of the first communication device, presenting, by the system, at a device activity information associated with the activities of the first communication device, facilitating, by the system, an exchange of messages between the device and the first communication device, receiving, by the system, a request from the device to transfer control of the first communication device to the device responsive to the device receiving an unsatisfactory response from the first communication device, and receiving, by the system, control information from the device to adjust an operational aspect of the first communication device.

Figure 2:
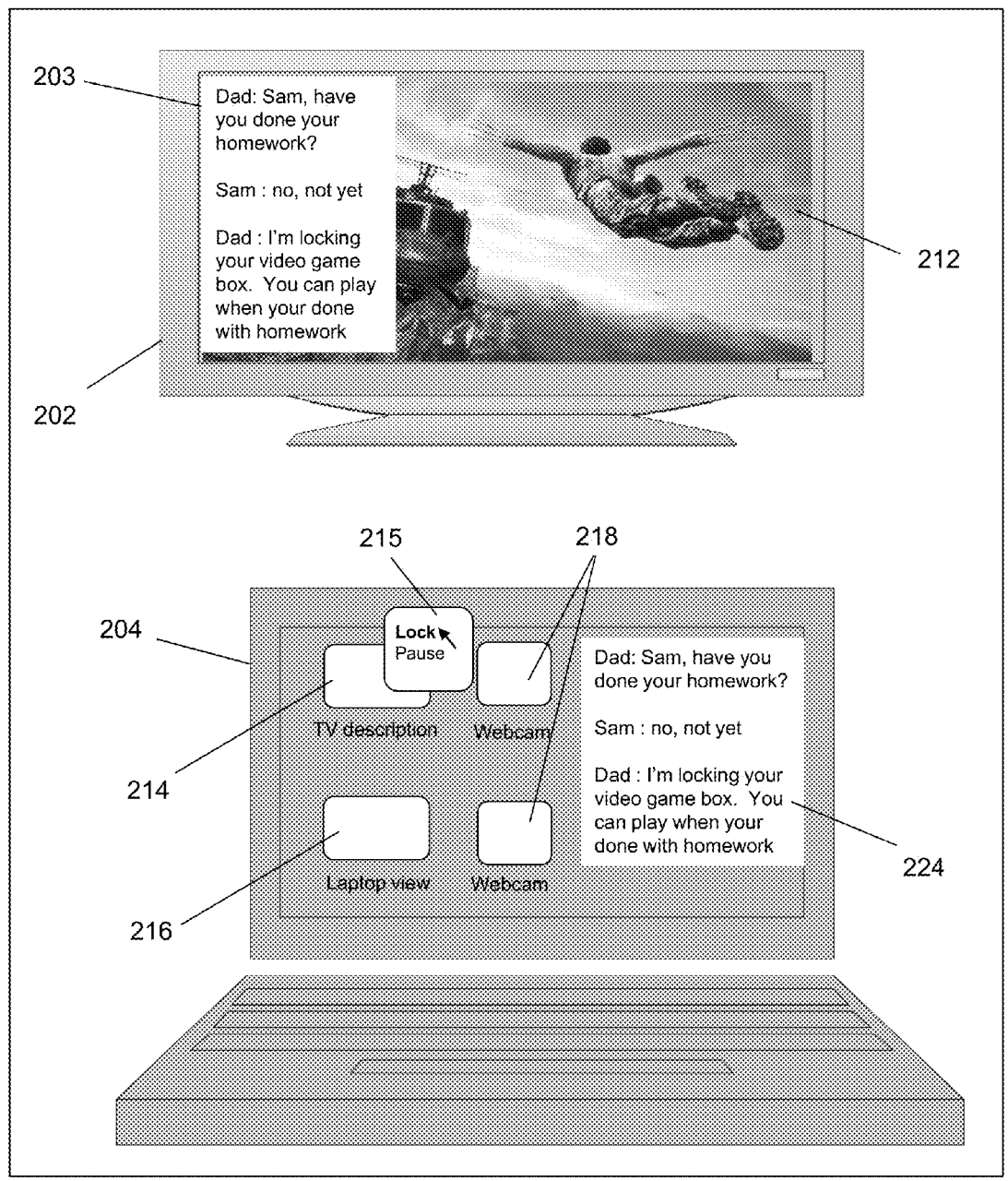
FIG. 2 depicts an illustrative embodiment of screen shots for monitoring and controlling devices.
Figure 3:
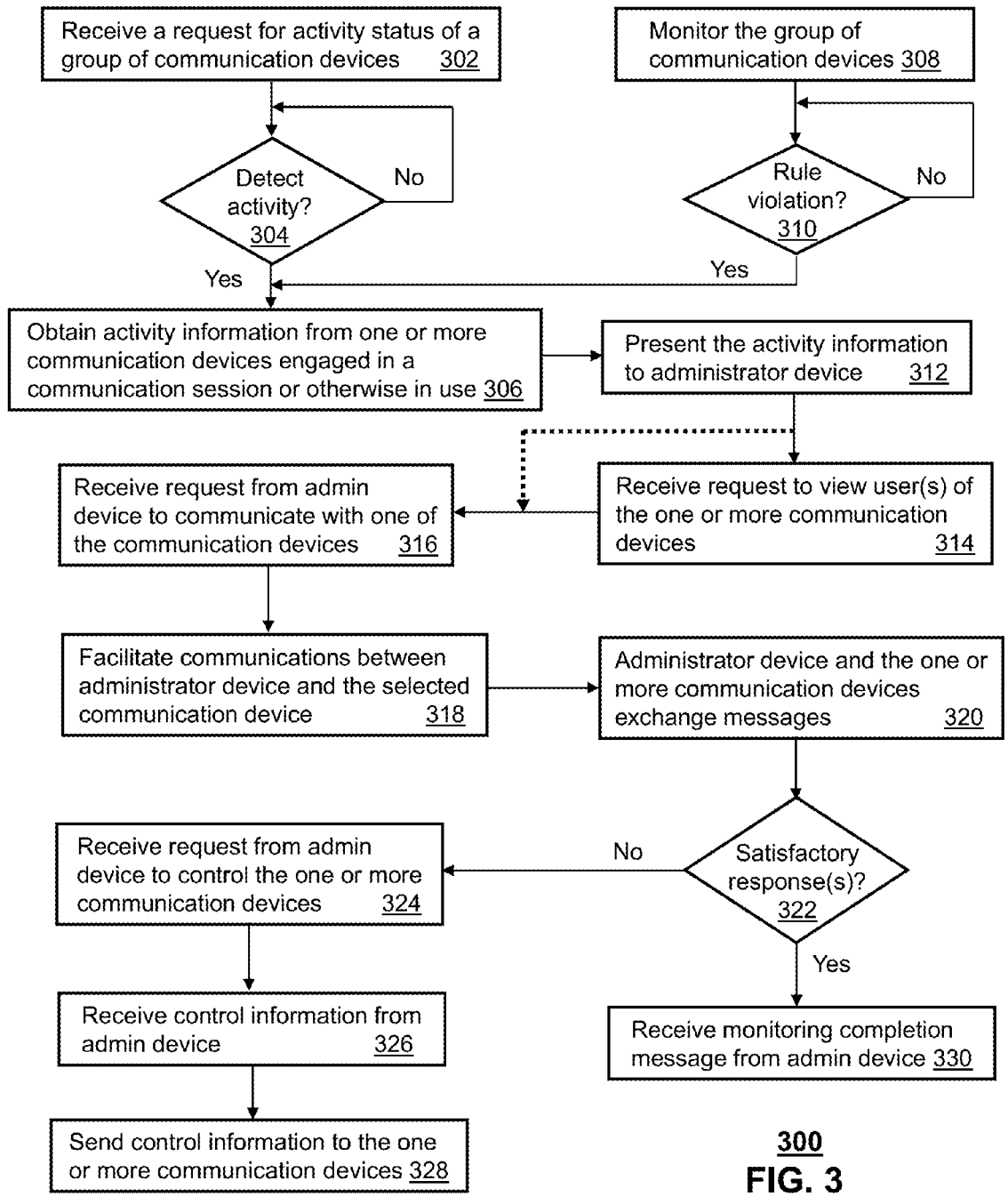
FIG. 3 depicts an illustrative embodiment of a method for monitoring and controlling devices.

FIG. 1 depicts an illustrative embodiment of a system 100 for monitoring and controlling devices. System 100 can comprise a server 102 that can be configured to communicate with the communication devices used by users 104, 114, and 116 via network 101. Network 101 can represent the public Internet, or other communication services, such as cellular wireless services. User 104 can represent an administrator (such as a parent or guardian) of the communication devices being used by users 114 and 116. FIG. 2 depicts an illustrative embodiment of screen shots enabling the administrative user 104 to monitor and control the devices used by users 114 and 116, described below according to a method 300 depicted in FIG. 3.

Method 300 can begin with step 302 where the server 102 receives a request from an administrator device of user 104 to obtain activity information relating to communication devices designated by user 104. The administrator device can be any computing device with communication resources such as a laptop computer as shown in FIG. 1. Method 100 can also apply to other communication devices used by user 104 such as a smart phone, a tablet, or a desktop computer. To initiate method 100, user 104 can, for example, log into a service provided by server 102 via a web browser. Once user 104 is logged into the services of the server 102, user 104 can initiate the request at step 302 by selecting, for example, an icon or symbol presented by way of a graphic user interface that represents the devices user 104 wishes to monitor. The icon once selected can signal the server 102 to obtain activity information for a group of communication devices which user 104 intends to monitor. The communication devices associated with the icon can be previously defined by user 104 when user 104 initially subscribes to the service provided by server 102. The identity of the communication devices (e.g., telephone number, IP address, Globally Unique Identifier or GUID, Uniform Resource Identifier or URI, etc.) to be monitored can be provided by user 104 during the set up process.

At step 304, if the communication devices user 104 wishes to monitor are not in use, then the server 102 can inform user 104 of this status and continue to monitor for activity at step 304 for as long as user 104 wishes or after a timeout period. If activity is detected at step 304 for one or more communication devices, the server 102 proceeds to step 306 where it obtains activity information from each communication device. The activity information can relate to a communication session that the one or more communication devices is engaged in, local resources of the one or more communication devices being used, and so on. A communication session can be an Internet communication session, a voice communication session, an instant messaging session, a communication session with a media content source, an on-line game communication session with a gaming server and possibly other on-line users, and so on. The communication device may be in use without engaging in communications with others, such as, for example, a user playing a locally stored video, or executing a locally stored video game without interaction with other users. The activity information obtained from each communication device can represent, among other things, information relating to internet activity, information relating to media consumption activity, information relating to a voice communication session, information relating to locally executed applications, and so on.

The server 102 can obtain activity information by communicating over network 101 with client software installed in the communication devices being monitored, or by other suitable techniques. Once the activity information is obtained, the server 102 can provide the information to the administrator device 204 of user 104 as depicted in FIG. 2. The administrator device 204 can present at step 312 activity information of users 114 and 116 in a browser or other suitable format. For example, in a graphical user interface presented at the administrator device 204, the server 102 can present a TV description 214, and a laptop view 216. The TV description 214 can include a text description of the activity information of the communication device being used by user 116. The text description can be synthesized by the server 102 from metadata provided to the server 102 by the communication device of user 116. The metadata can describe TV programming, video game information, or other related information descriptive of the activity which user 116 is experiencing.

Alternatively, or in combination the TV description 214 can include a still image, or a video image of what is being presented at the communication device of user 116. Additionally, the server 102 can present a history of what has been previously viewed by user 116, and any behavioral pattern that has been detected in relation to user 116 (e.g., "user 116 appears to play video games from 4-5 pm daily, browses the Internet at approximately 7:30 pm for comic books, and so on). Similarly, the laptop view 216 can present textual, still image, video image, historical viewing information, or combinations thereof. The laptop view 216 can be a snapshot view of desktop being viewed by user 114.

When communication devices are shared, it may not always be apparent to user 104 who is using a particular device based on the activity information provided by server 102. In such instances, user 104 can request with user input a viewing at step 314 of the users of the communication devices by way of webcams coupled to the monitored communication devices that provide image information to the server 102, which in turn presents such images in the webcam windows 218 of the laptop of user 104. In another embodiment, user 104 can create a user profile that automatically requires webcam views, which the server 102 can retrieve once activity is detected at step 304. If webcam viewings are not required, step 314 can be skipped.

Based on what user 104 sees in the TV description 214 or the laptop view 216, user 104 can choose to select at step 316 a user to communicate with by, for example, selecting either the TV description 214 or the laptop view 216 with a mouse button, or by providing other user input such as speech, or text entry in a graphical user interface presented by the server 102. When a selection is made, the server 102 facilitates at step 318 communications with the selected communication device, which in this illustration is the TV set 202 being viewed by user 116.

Once communications are established by way of network 101 between the administrator device 204 and the TV set 202 (communicatively coupled to the server 102 by way of a set-top box or gaming console 117), users 104 and 116 can begin to exchange messages which are displayed on the administrator device 204 and the TV set 202 as shown by references 224 and 203. Alternatively, or in combination, the messages can be audio messages exchanged between user 104 and 116. Video images of users 104 and 116 can also be initiated with the respective webcams of the administrator device 204 and the TV set 202. In one embodiment, when messages are initiated, the video game 212 can be paused to get the attention of user 116. When text messages are used, such messages can depict who the message is from and the corresponding response.

In this illustration, user 104 (referred to as "Dad") is asking user 116 (depicted as "Sam", who is recognized by user 104 by way of the webcam) whether he has completed his homework. Sam responds that he hasn't. The father in turn finds this response at step 322 unsatisfactory, and decides he's locking access to the video game 212 being played by Sam by, for example, right clicking with a mouse pointer the TV description 214, which in turn causes the server 102 to present a graphic user interface (GUI) 215 with an option to lock the gaming device or permanently pause the game. In this instance the father has chosen to lock the game by clicking the left mouse button to select the option "Lock". To unlock or remove a permanent pause, user 104 can right click at a later time the TV set 214 GUI, which in turn generate a new GUI 215 with the reverse options to unlock or remove pause (not shown in the illustration of FIG. 2. In another embodiment not shown in FIG. 2, the server 102 can present at the administrator device of user 104 a timer field for entering a time for removal of the lock or pause options.

Once the "Lock" selection is made in GUI 215, the administrator device 204 sends at step 324 a request to the server 102 to control the gaming console 117 based on instructions provided to the server 102 at step 326 to lock access to the video game console 117. These instructions are in turn conveyed by the server 102 to the software client executed by the gaming console 117 to implement the requested lockdown of the console. The lockdown can be implemented by locking only the account associated with Sam, locking the unit as a whole, or by using image recognition technology in the gaming console 117 (or in the server 102) to monitor images captured from a webcam at or near the TV set 202, and locking access to the gaming console 117 when Sam's image is detected.

It should be noted that any aspect of a communication device being controlled by user 104 is possible. For example, the server 102 can be configured to provide user 104 control of a visual presentation by the gaming console 117, volume of audio presented by the gaming console 117, updates to parental control rules or profiles for managing use of the gaming console 117, or any combination thereof. For example, one way to lock the video game is to pause the video game permanently, and/or present a password protected screen saver. Alternatively, or in combination, the audio feature of the game can be turned off in addition to team chat. As features are removed from the video game, Sam may be less inclined to continue playing the game.

The foregoing embodiments can be automated in part. For instance, user 104 can provision parental controls at server 102 to monitor communication devices identified by user 104. The parental controls can define time ranges for allowing or disallowing certain activities, or other triggers that can be tracked by the server 102 at step 308 without intervention by user 104. When a parental control rule is violated at step 310, the process beginning from step 306 can be initiated as described previously.

It is further noted that the foregoing embodiments can be performed on any communication device whether the communication device of user 104 is in the premises of user 104, or user 104 is in a remote location. It is further noted that method 100 can be applied to managing voice communication services as well as data services. For example, user 104 can decide to temporarily disable voice communication services of a communication device for a particular user to manage the user's behavior. Method 100 can also be applied to a residential gateway device in the premises of user 104. For example, user 104 can block Internet access to particular URL's, access to TV programming at certain times, and so on.

Figure 4:
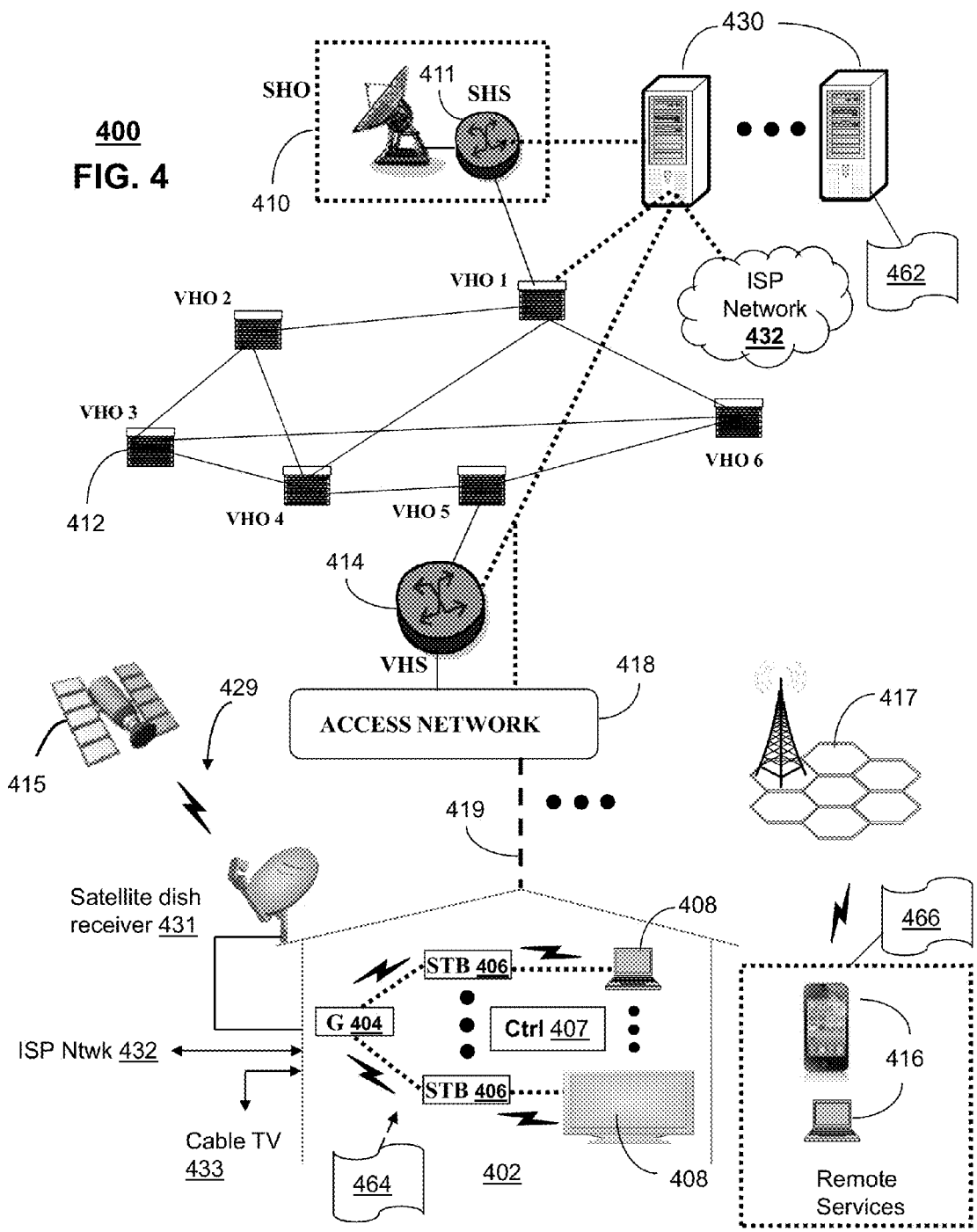
FIGS. 4-5 depict illustrative embodiments of communication systems that provide media services that can be managed according to the method of FIG. 3.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. Communication system 400 can be configured to perform the embodiments of method 100 on any device depicted in FIG. 4.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server (herein referred to as server 430). The server 430 can use computing and communication technology to perform function 462, which can include among other things, the embodiments described for method 100. The media processors 406 and wireless communication devices 416 can be provisioned with software functions 464 and 466, respectively, to utilize the services of server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
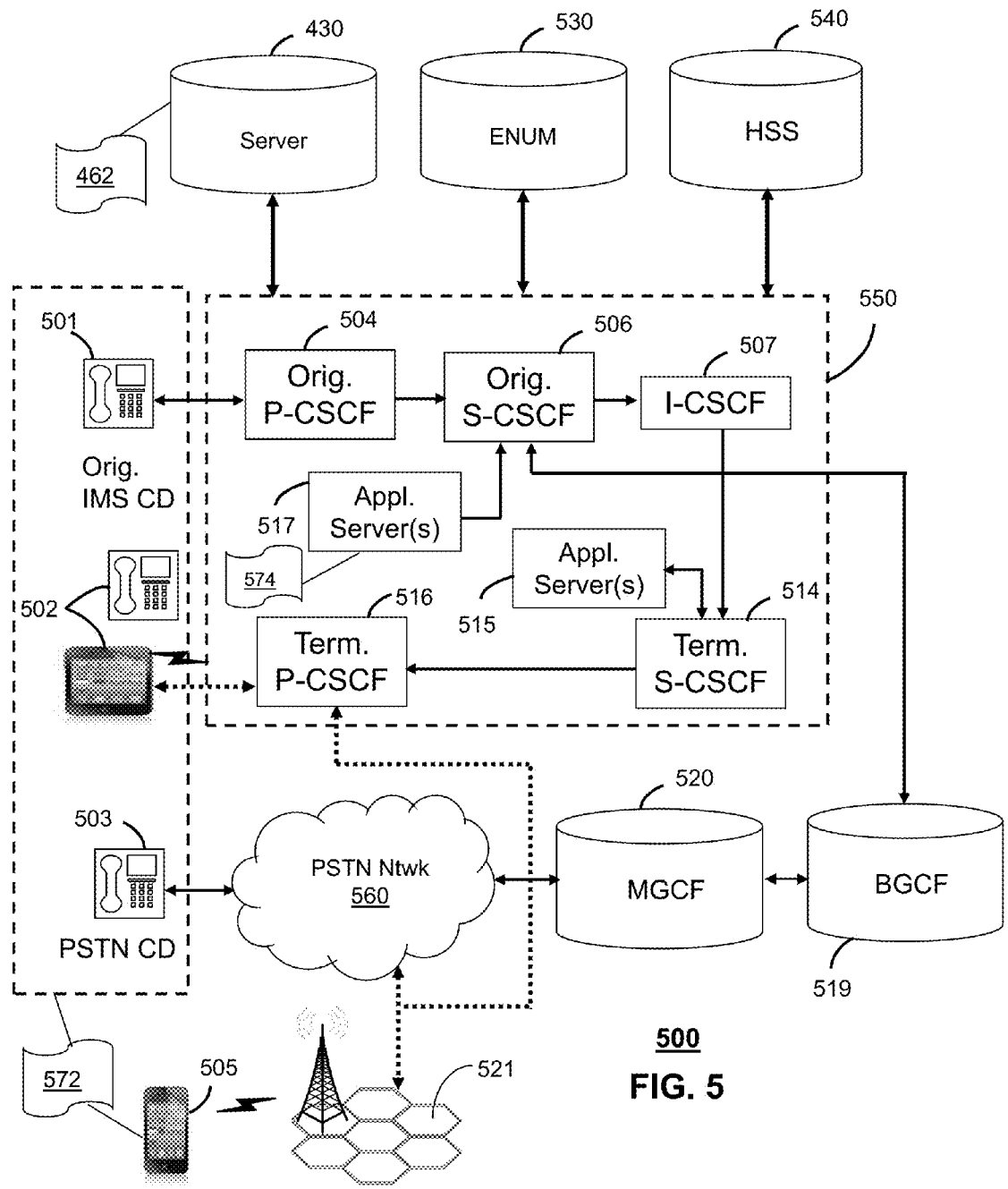

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. Communication system 500 can be configured to perform the embodiments of method 100 on any device depicted in FIG. 5.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. Server 430 can perform function 462 and thereby provide monitoring and control services to the CDs 501, 502, 503 and 505 of FIG. 5. CDs 501, 502, 503 and 505, which can be adapted with software to perform function 572 to utilize the services of the server 430. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
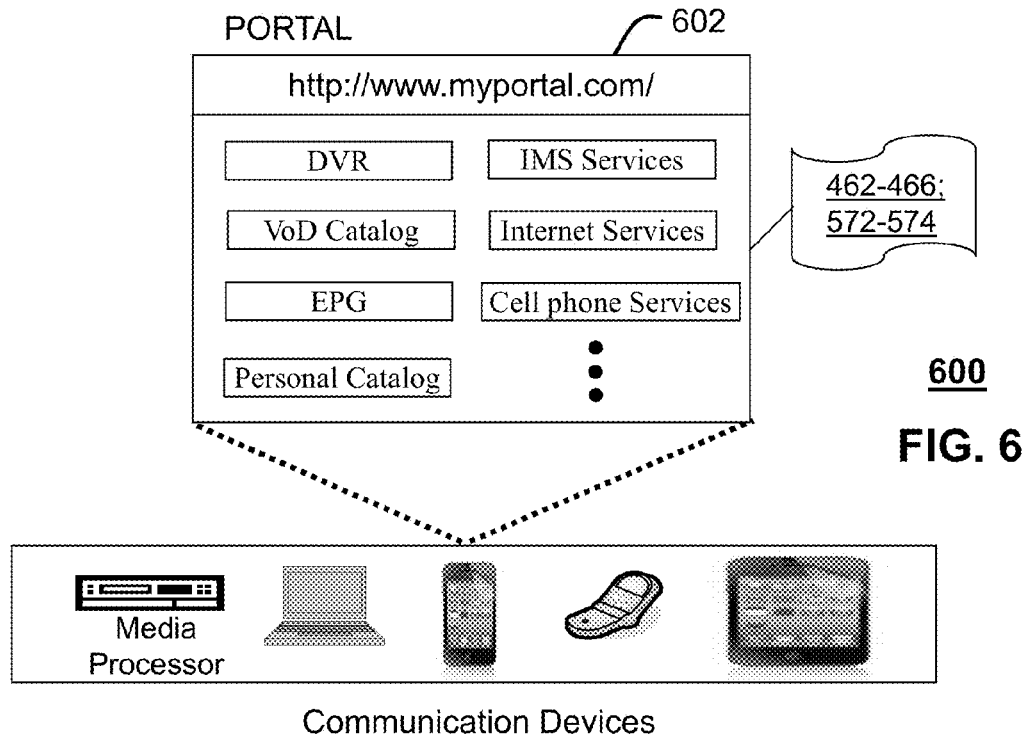
FIG. 6 depicts an illustrative embodiment of a web portal for interacting with the communication systems of FIGS. 1 and 4-5 according to the method of FIG. 3.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with system 100 of FIG. 1, communication 400, and/or communication system 500 as another representative embodiment of system 100, communication 400, and/or communication system 500. Web portal 602 can be configured to perform the embodiments of method 100 for any devices accessing the web portal 602. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can be utilized to manage and provision software applications 462-466, and 572-574 to adapt these applications as may be desired by subscribers and/or service providers of system 100, and communication systems 400-500.

Figure 7:
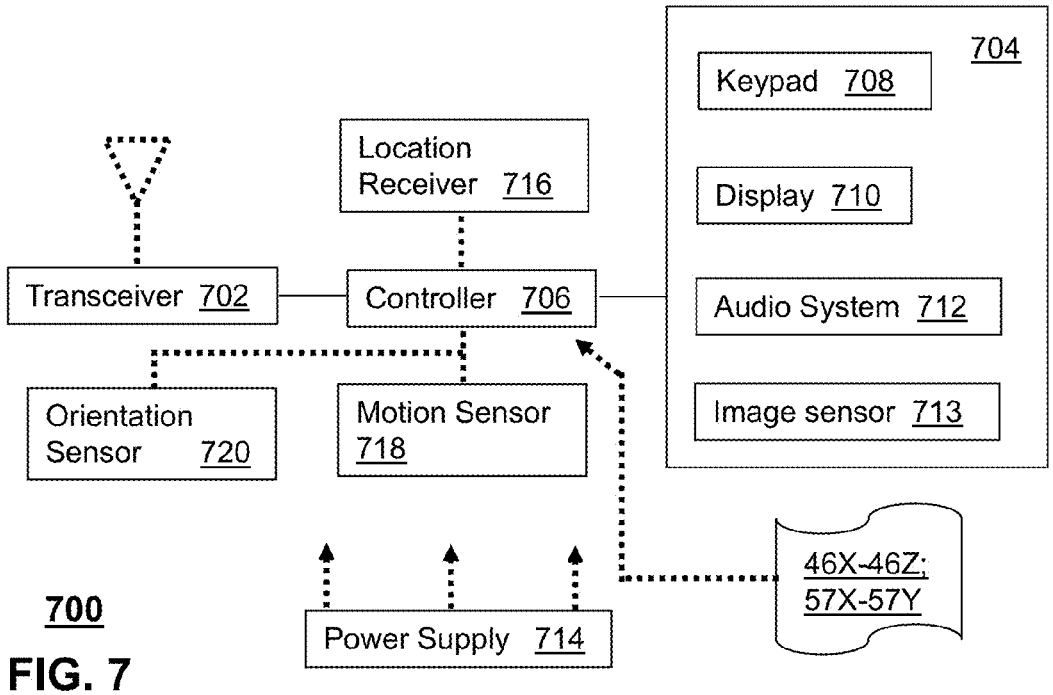
FIG. 7 depicts an illustrative embodiment of a communication device that can be configured according to the method of FIG. 3.

FIG. 7 depicts an illustrative embodiment of a communication device 700. Communication device 700 can serve in whole or in part as an illustrative embodiment of the devices depicted in system 100 of FIG. 1, and FIGS. 4-5. Communication device 700 can be configured to perform the embodiments of method 100 for any devices described in the above embodiments.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of system 100 of FIG. 1, communication system 400, and communication system 500. In addition, the controller 706 can be adapted in various embodiments to perform the functions 462-466 and 572-574, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
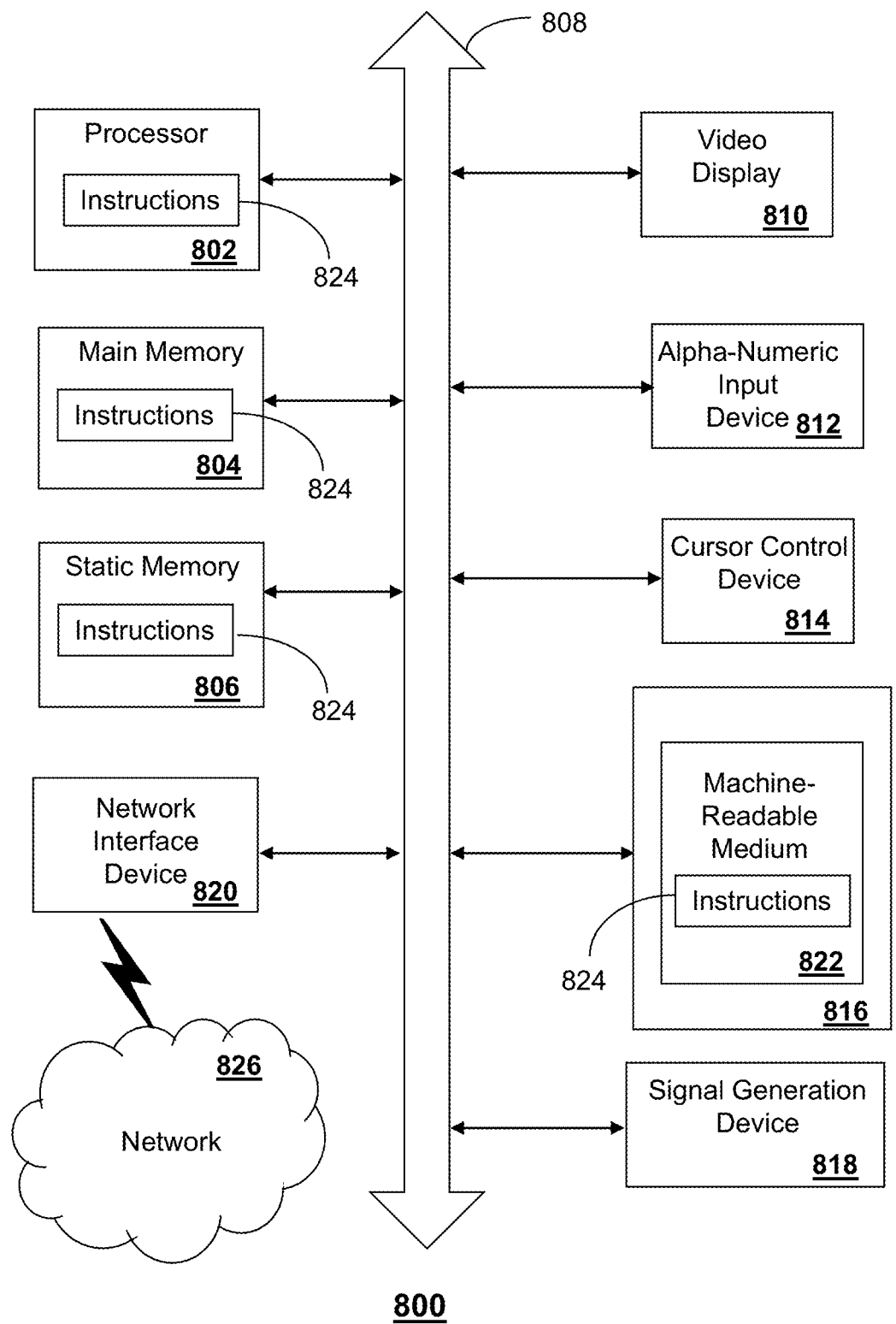
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 102, server 430, and other devices depicted in FIGS. 1 and 4-6. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network device, comprising:
   a memory that stores instructions; and
   a processor coupled to the memory, wherein responsive to executing the instructions, the processor performs operations comprising:
      receiving a first request from a controller to provide status information relating to activities of a plurality of communication devices;
      detecting a first communication device of the plurality of communication devices engaged in a communication session, wherein the communication session comprises one of a video game session or an online communications session;
      providing, to the controller, activity information associated with the communication session to enable the controller to present the activity information;
      receiving a second request from the controller to initiate communications between the controller and the first communication device responsive to the activity information not conforming to a parental control rule;
      facilitating an exchange of messages between the controller and the first communication device responsive to the second request, wherein the facilitating comprises locking the communication session of the first communications device during the exchange of messages;
      receiving a command from the controller to un-lock the first communication device responsive to the controller receiving a first response, that is determined to be a satisfactory response, from the first communication device;
      receiving a third request from the controller to transfer control of the first communication device to the controller responsive to the controller receiving a second response, that is determined to be an unsatisfactory response, from the first communication device during the exchange of messages; and
      receiving control information from the controller to adjust an operational aspect of the first communication device.

2. The network device of claim 1, further comprising a gateway located at a premise, and wherein the gateway provides internet service, media services, communication services, or any combination thereof to the plurality of communication devices while the plurality of communication devices are in a communication range of the network device.

3. The network device of claim 2, wherein the activity information comprises information descriptive of the communication session and wherein the information comprises one of information relating to internet activity, information relating to media consumption activity, information relating to a voice communication session, information relating to locally executed applications, or any combination thereof.

4. The network device of claim 1, further comprising a network node of a communication system providing internet, media services, communication services, or any combination thereof to the plurality of communication devices while the plurality of communication devices are remote from a gateway located at a premise.

5. The network device of claim 1, wherein the first communication device comprises one of a set-top box, a portable communication device, or a computer.

6. The network device of claim 1, wherein the activity information is presented as one of a video presentation, a still image presentation, an audio presentation, a textual presentation, or any combination thereof.

7. The network device of claim 1, wherein the activity information comprises historical information collected from prior communication sessions of the first communication device.

8. The network device of claim 1, wherein the communication session comprises metadata, and wherein the operations further comprise determining the activity information from the metadata.

9. The network device of claim 1, wherein the controller comprises a portable communication device.

10. The network device of claim 1, wherein a first message of the messages exchanged between the controller and the first communication device is presented at a display of the first communication device.

11. The network device of claim 10, wherein the first message is presented at the display concurrently with media content received and presented by the first communication device at the display.

12. The network device of claim 10, wherein the first message presented at the display of the first communication device comprises one of a video presentation, a still image presentation, an audio presentation, a textual presentation, or any combination thereof.

13. The network device of claim 1, wherein the operations further comprise transmitting the control information to the first communication device to adjust the operational aspect of the first communication device.

14. The network device of claim 13, wherein the operational aspect comprises one of a visual presentation by the first communication device, an audio presentation by the first communication device, a parental control feature of the parental control rule, or any combination thereof.

15. A machine-readable storage device, comprising instructions, wherein responsive to executing the instructions by a processor, the processor performs operations comprising:

monitoring a plurality of communication devices according to a parental control profile;

selecting a first communication device of the plurality of communication devices to analyze communication activities of the first communication device according to the parental control profile;

providing, to a controller, activity information associated with the communication activities of the first communication device, wherein the activity information comprises one of information relating to internet activity, information relating to media consumption activity, information relating to a voice communication session, information relating to locally executed applications, or any combination thereof;

receiving a first request from the controller to initiate communications between the controller and the first communication device responsive to the activity information not conforming to a parental control rule;

facilitating an exchange of messages between the controller and the first communication device responsive to the first request, wherein the facilitating comprises locking an activity of the first communications device;

receiving an unlock command to unlock the activity of the first communications device responsive to the controller receiving a first response, that is determined to be a satisfactory response, from the first communication device;

receiving a second request from the controller to transfer control of the first communication device to the controller responsive to the controller receiving a second response, that is determined to be an unsatisfactory response, from the first communication device; and receiving control information from the controller to adjust an operational aspect of the first communication device.

16. The machine-readable storage device of claim 15, wherein the first communication device comprises one of a set-top box, a portable communication device, or a computer.

17. The machine-readable storage device of claim 15, wherein the activity information comprises information descriptive of a communication session of the first communication device, and wherein the activity information is presented as one of a video presentation, a still image presentation, an audio presentation, a textual presentation, or any combination thereof.

18. A method, comprising:

selecting, by a system comprising a processor, a first communication device of a plurality of communication devices to analyze activities of the first communication device;

providing, by the system to a control device, activity information associated with the activities of the first communication device, wherein the activity information comprises one of information relating to internet activity, information relating to media consumption activity, information relating to a voice communication session, information relating to locally executed applications, or any combination thereof;

receiving, by the system, a first request from the controller to initiate communications between the controller and the first communication device responsive to the activity information not conforming to a parental control rule;

facilitating, by the system, an exchange of messages between the control device and the first communication device, wherein the facilitating comprises locking an activity related to the activity information of the first communications device;

receiving, by the system, a command from the control device to un-lock the first communication device responsive to the control device receiving a first response, that is determined to be a satisfactory response, from the first communication device;

receiving, by the system, a second request from the control device to transfer control of the first communication device to the control device responsive to the control device receiving a second response, that is determined to be an unsatisfactory response, from the first communication device; and receiving, by the system, control information from the control device to adjust an operational aspect of the first communication device.

19. The method of claim 18, wherein the system selects the first communication device to analyze the activities of the first communication device as analyzed activities responsive to one of receiving a selection request from the control device or detecting a violation of a rule in a parental control profile based on the analyzed activities of the first communication device.

\* \* \* \* \*